C. A. ROBERTS.
AUTOMOBILE SLEIGH.
APPLICATION FILED DEC. 28, 1916. RENEWED DEC. 4, 1917.
1,256,261.
Patented Feb. 12, 1918.
3 SHEETS—SHEET 3.
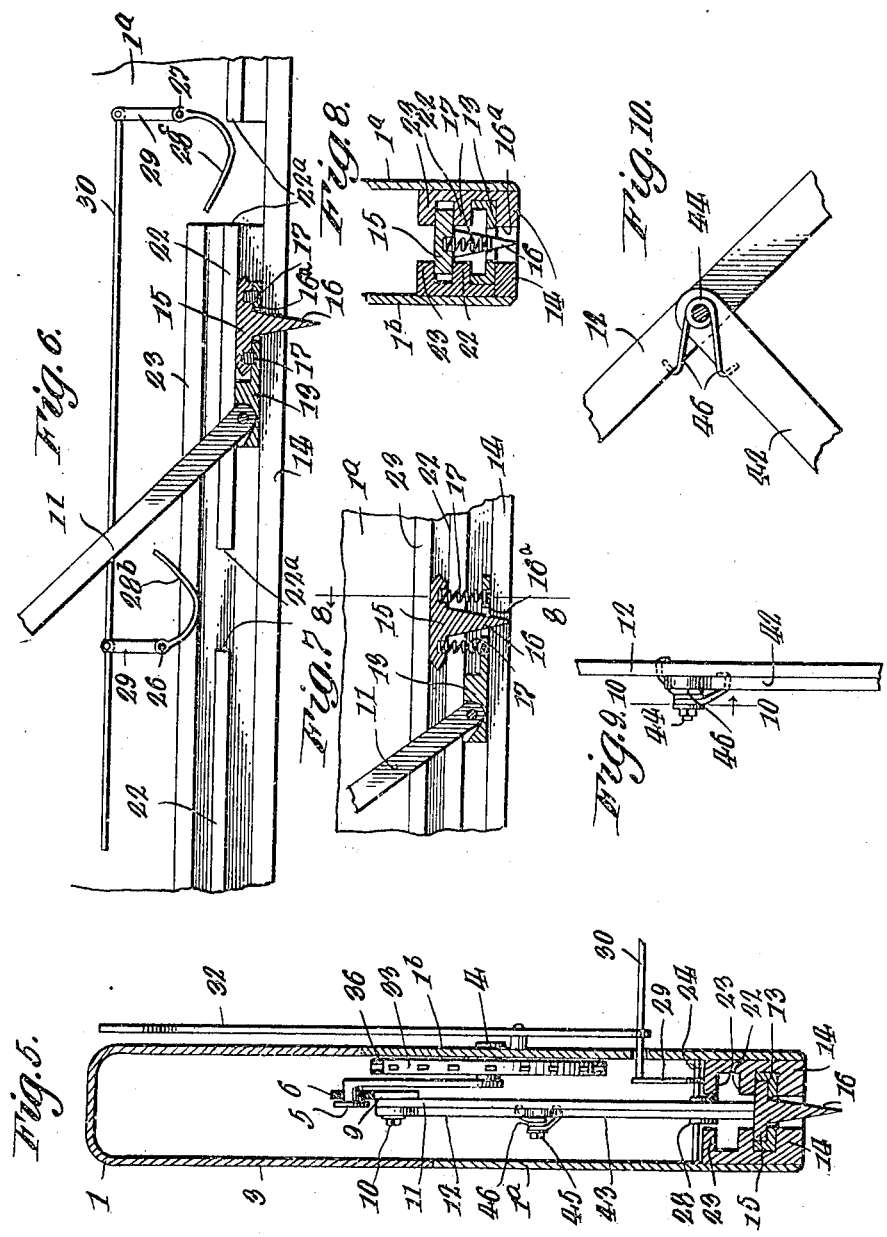
INVENTOR
Chester A. Roberts.
WITNESSES
BY
ATTORNEY

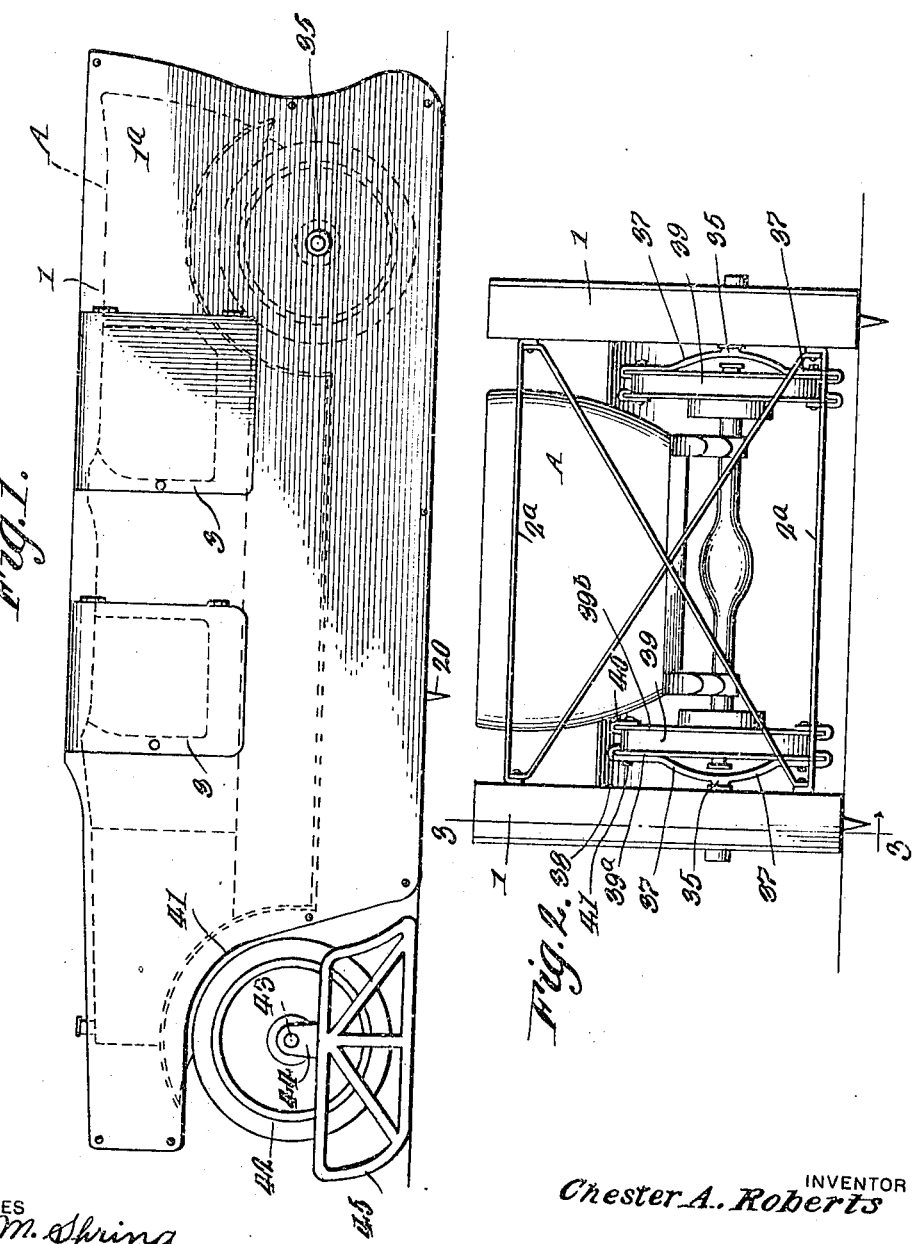

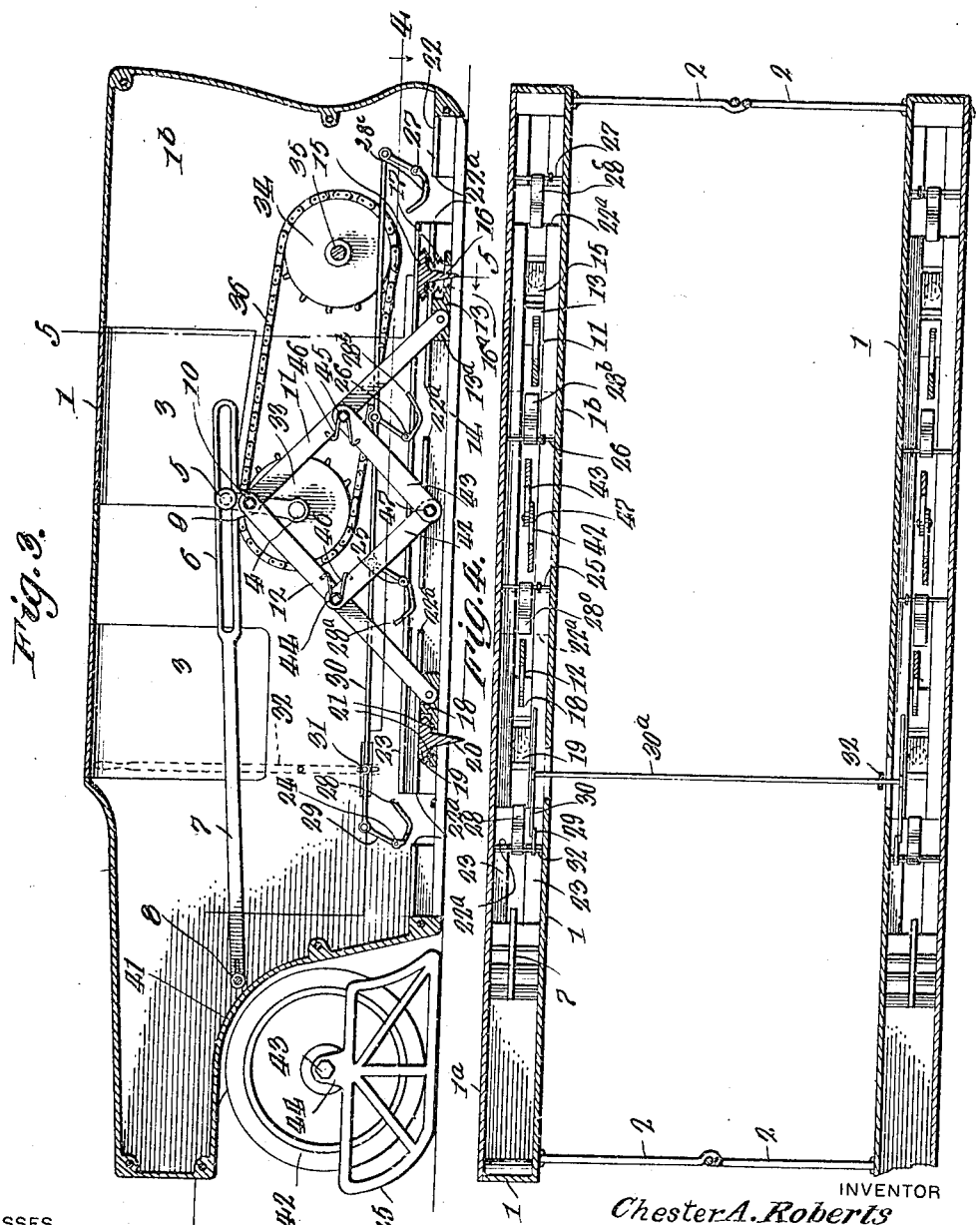

UNITED STATES PATENT OFFICE.

CHESTER A. ROBERTS, OF ALLEGAN, MICHIGAN.

AUTOMOBILE SLEIGH.

1,256,261.  Specification of Letters Patent.  Patented Feb. 12, 1918.

Application filed December 28, 1916, Serial No. 139,327. Renewed December 4, 1917. Serial No. 205,434.

*To all whom it may concern:*

Be it known that I, CHESTER A. ROBERTS, a citizen of the United States, residing at Allegan, in the county of Allegan and State of Michigan, have invented certain new and useful Improvements in Automobile Sleighs, of which the following is a specification.

This invention relates to automobile sleighs, and more particularly to a frame adapted to support an automobile and provided with propelling means connectible to the rear wheels of the automobile so as to be operable thereby.

One of the main objects of the invention is to provide a frame of light and durable construction having means for supporting an automobile above the ground surface. A further object is to provide a frame provided with means for translating the rotary movement of the rear wheels of the automobile into reciprocatory motion for imparting movement to the frame. A still further object is to provide simple and efficient means whereby the direction of travel of the automobile supporting frame may be quickly and easily reversed. Further objects will appear from the detailed description.

In the drawings:

Figure 1 is a side view of a frame constructed in accordance with my invention, and an automobile supported in the same, Fig. 2 is a back view of the same, Fig. 3 is a section taken on line 3—3 of Fig. 2, Fig. 4 is a section on line 4—4 of Fig. 3, Fig. 5 is a section on line 5—5 of Fig. 3, Fig. 6 is a detail sectional view of one of the gripping members and its mounting, and the arm for operating the gripping member, the gripping member being in locked position, Fig. 7 is a similar view of the gripping member and its operating arm, the gripping member being in raised position between the upper guides, Fig. 8 is a section on line 8—8 of Fig. 7, Fig. 9 is a detail of one of the joints of the operating tongs for the gripping members, and Fig. 10 is a section on line 10—10 of Fig. 9.

The numeral 1 designates a housing or casing of approximately rectangular vertical cross section. There are two of these casings provided secured in parallel spaced relation by the stay rods 2 and braces 2ª. The casing 1 conforms approximately in shape and appearance to the side of an automobile being of somewhat greater length and height so that, when the casings are assembled in this manner it produces the appearance of an automobile in side view. Each of the casings is provided with doors 3 hingedly secured thereto to open outward which doors are positioned in alinement with the doors of an automobile A supported between the two casings 1 in a manner to be later described. The doors 3 are of U-shape in vertical cross section and, when in closed position, register with the side walls of the casing so as to form a continuation thereof.

Mounted in each casing 1, at the approximate center thereof, is a rotatable stub-shaft 4 and a crank 5 is secured to this stub shaft and is passed through a slot 6 in an arm 7 which is secured by pin and slot connections to the plate 1, as at 8.

Arm 7 is provided with an integral downwardly extending lug 9 which receives a pivot bolt 10 pivotally connecting the upper ends of the arms 11 and 12 which form a toggle arm. The lower end of arm 11 is pivotally secured in a block 13 which is slidable on the spaced runners 14 at the bottom of casing 1, the block being provided with a suitable recess or groove 13ª to permit proper movement of arm 11. The outer portion of upper face of block 13 is cut away to receive a gripping head 15 provided with an integral downwardly extending point 16 which is passed through an aperture 16ª through the block. At each side of point 16, and equi-distant therefrom, a coil expansion spring 17 is confined between the head 15 and the block 13. These springs act to exert upward pressure on the head so as to lift the same thus raising the point 16 into inoperative position. The lower end of arm 12 is similarly secured to a block 18 provided with a head 19 having a gripping point 20 which is normally pressed upward by the coil expansion springs 21.

A guide strip 22 is secured to each side of casing 1 above the runner 14. This guide strip is spaced from the runner a distance corresponding approximately to the thickness of the blocks 13 and 18, thus providing, in conjunction with the runners, guide-ways for the blocks. A second strip 23 is secured above strip 22 parallel and in spaced relation therewith. The strips 22 and 23 are spaced a distance apart corresponding to the thickness of the operating heads 15 and 19. The lower strip 22 is provided with a plurality of equally spaced openings 22$^a$. These openings are of approximately the same length as the heads 15 and 19 so that, when the heads are brought into position below or above the openings they may be passed through them so as to occupy a position between the two strips 22 and 23 or between the runners 14 and strip 22.

A plurality of transverse rods 24, 25, 26 and 27 are rockably mounted in casing 1 above the upper guide strips 23. As will be noted from Fig. 3 of the drawings, rods 24 and 27 are positioned adjacent the outer ends of the front and back openings 22$^a$ of guide strip 22, and rods 25 and 26 are positioned adjacent the inner ends of the two inner openings 22$^a$.

Secured on each of the transversely extending rods is an arcuate guide plate, these plates being alternately and oppositely directed. An arm 29 is secured at its lower end to each of the rods and, at its upper end is pivotally connected to a longitudinally extending pull rod 30. A transversely extending operating rod 30$^a$ is pivotally secured at its ends to the pull rods 30 in the casings 1. This rod 30$^a$ passes through a slot in the lower end of a lever 32 pivotally mounted intermediate its ends on the inner face of one of the casings, thus providing pin and slot connections 31 between the hand lever and the pull rods for rocking the transverse rods 24, 25, 26 and 27 about their axes of rotation. With the guide plates 28, 28$^a$, 28$^b$, and 28$^c$, in the position shown in Fig. 3 of the drawings, when the block 13 is moved rearward so as to bring head 15 below the rearmost opening 22$^a$ of guide strip 22, the expansion springs 17 will act to raise the head, the upward movement of the head being positively limited by the rearmost guide plate 28$^c$. As the block is drawn forward the head travels between the guide strips 22 and 23 until it is brought into a position above the next to the rearmost opening 22$^a$ where it will encounter the guide plate 28$^b$ which acts to depress the head so as to bring the upper face thereof flush with the upper face of block 13. As the block again moves rearward the head will be in depressed position, being retained in this position by the guide strip 22. When the head is depressed the point 16 thereof will extend downward between the runners 14 so as to bite into or grip the surface upon which the sleigh travels thus acting to force the sleigh forward or propel it. As the front block 18 moves rearward of the casing it is held in depressed position so as to cause the point 20 of head 19 to grip the surface upon which the sleigh travels thus acting to propel the sleigh in the same manner as the rearward head 15. When block 18 is moved into such position as to bring the head 19 beneath the next to the foremost opening 22$^a$ of guide strip 22 the head will be forced upward by the springs 21, its upward movement being limited by the guide plate 28$^a$. As the block is moved forward the head will travel between the strips 22 and 23 so as to hold the gripping point 20 in inoperative position. As the head 19 approaches the end of its forward movement it will engage the forward guide plate 28 so as to be depressed into such a position as to be positioned within the block 18 during the rearward movement of the same. To permit this operation of the heads 15 and 19, the heads correspond in width to the distance between the two guide strips 22 and 23. Also, the ends of each head are beveled oppositely from each end to the center, thus giving a triangular or V-shape which insures that the heads will enter readily between the guide strips 22 and 23 or beneath the strip 22, as the case may be. It will, of course, be understood that the guide plates 28, 28$^a$, 28$^b$ and 28$^c$ are so shaped that, when moved into depressed position the lowest point of curvature of each plate will be in a horizontal plane which coincides with the under face of the guide strip 22, thus insuring that the gripping head will be depressed into proper position to pass readily beneath the guide strip.

As the forward gripping head 19 is moved into inoperative position, the rear head 15 is moved into operative position and vice versa, thus insuring a continuous and smooth operation of the mechanism which enables the sleigh to be propelled at relatively high speed and eliminates all unnecessary jerking and jarring such as would occur were this engagement of the propelling means intermittent instead of continous. By shifting the hand lever 32 so as to move the pull rod 30 in a forward direction the rods 24, 25, 26, and 27 will be rocked so as to raise the plates 28, 28$^b$, depressing plates 28$^a$ and 28$^c$. With the plates in this position, the head 15 will be held raised during its rearward travel and depressed during its forward travel, and the head 19 will be held depressed during its forward travel and raised during its rearward travel, thus reversing the direction of travel of the sleigh. This provides simple and efficient means whereby the sleigh may be caused to travel in either direction desired. On the other hand, if the hand lever 32 be moved into an intermediate position, the guide plates 28, 28ª, 28ᵇ and 28ᶜ will be brought into such position as to prevent the heads 15 and 19 from being raised sufficiently to pass between the guide strips 22 and 23, thus locking the sleigh against movement in either direction.

A sprocket wheel 33 is keyed on shaft 4. This sprocket wheel is in alinement with a sprocket wheel 34 keyed on a transverse shaft 35 rotatably mounted in the casing 1, the two sprocket wheels being operatively connected by a chain 36 passed about the same. Shaft 35 extends inward through the inner plate 1ª of casing 1 and is provided, at its inner end, with two integral radially extending and diametrically opposite arms 37. Each of these arms is turned over, at its outer end, to form a clip 38 which snugly receives the outer flange 39ª of the rim 39 of the rear wheel of the automobile 2ª. A clip 40 is mounted about the inner flange 39ᵇ of rim 39, the two clips 38 and 40 being secured together by a bolt 41 passed through the same and inside of the felly of the wheel, or in any other suitable manner. The two shafts 35 are in axial alinement so that, by this means, the rear wheels of the automobile are supported between the casings 1 in alinement transversely of the frame formed by the casings thus supporting the rear portion of the automobile in raised position. The forward portion of each frame 1 is provided with a cut out or rearwardly arched portion or recess 41. These cut outs provide recesses which receive the front wheels 42 of the automobile. Each of the spindles 43 of the front wheels 42 is secured through a standard 44 which extends upward from the runner 45, which is of such length as to fit within the outlines of the casing 1 and inside of the cut out 41. By this means the front of the automobile is secured in raised position, and the runners 45 may be turned by means of the usual steering gear of the automobile so as to guide the sleigh. With the automobile in position, the sleigh presents a neat appearance which closely resembles that of a large automobile, and may be driven directly from the rear wheels of the automobile, the steering gear of the automobile being utilized for steering the sleigh. In addition, ready access may be had to the automobile by means of the doors 3. When the rear wheels of the automobile are driven by the automobile engine, rotation is imparted to the sprocket wheels 34. As the sprocket wheels 34 are rotated the wheels 33 will also be rotated thus operating the crank 5 so as to cause vertical reciprocation of the inner end portion of arm 7. When the arm is depressed the toggle composed of the arms 11 and 12 will be spread so as to force the blocks 13 and 18 outward in opposite directions, and when the toggle is contracted these blocks will be moved toward each other, the blocks and the operating heads carried thereby thus being reciprocated toward and away from each other during rotation of the rear wheels of the automobile. The reciprocation of the blocks acts to propel the sleigh in the manner previously described.

Two arms 42 and 43 are pivotally secured at their upper ends to the toggle arms 11 and 12 respectively, intermediate the ends thereof, by the pivot bolts 44 and 45. A two armed expansion spring 46 is coiled about each of these pivot bolts and has its arms hooked over the inner edges of the arms 42 and 43 and 11 and 12. The lower ends of the arms 42 and 43 are pivotally connected by a pivot bolt 47. The arms 42 and 43 and 11 and 12 provide, in effect, a lazy tongs, these tongs being spread or expanded when the arm 7 is depressed and contracted when arm 7 is raised. The springs 46 act to force the arms 11 and 43 and 12 and 42 apart so as to contract the lazy tongs thus materially assisting in the operation of the propelling mechanism and preventing all play between the arms of the tongs. The arms 7, in addition to providing means for connecting the cranks 5 and the lazy tongs also act as balance beams or weights which insure smooth and accurate operation of the propelling mechanism.

There may be slight changes made in the construction and arrangement of the different parts of my invention without departing from the field and scope of the same, and I intend to include all variations which fall within the scope of the appended claims in this application in which a preferred form only of my invention is disclosed.

What I claim is:

1. In automobile sleighs, the combination of a casing, blocks slidably mounted therein, a gripping head carried by each of said blocks, means for reciprocating each of said blocks, and means for holding one of the gripping heads depressed during its movement in one direction and for holding the other head depressed during its movement in the opposite direction.

2. In automobile sleighs, the combination of a casing provided with a pair of spaced runners, a pair of oppositely movable blocks slidably mounted on the upper face of said runners, means for reciprocating said blocks, gripping heads carried by the blocks and operable between the said runners, and means for holding one of said heads depressed during its movement in one direction and for holding the other head depressed during its movement in the opposite direction.

3. In automobile sleighs, the combination of a casing provided with a pair of spaced runners, a pair of oppositely movable blocks slidably mounted on the upper face of said runners, means for reciprocating said blocks, gripping heads carried by the blocks and operable between the said runners, and means for holding one of said heads depressed during its movement in one direction and for holding the other head depressed during its movement in the opposite direction, said means being adjustable so as to reverse the directions of movement during which the said heads are held depressed.

4. In automobile sleighs, the combination of a casing provided with two spaced runners, a pair of oppositely movable blocks slidably mounted on said runners, means for reciprocating said blocks, a gripping head carried by each block and provided with a downwardly extending gripping point, means for raising said head, and means for depressing said head and maintaining it depressed during its travel in one direction and for permitting said head to be raised and holding it in raised position during its travel in the other direction.

5. In automobile sleighs, the combination of a casing provided with two spaced runners, guide strips mounted above said runners in spaced relation thereto and to each other, the lower one of said guide strips being provided with spaced openings, blocks slidable between the lower guide strip and the runners, means for reciprocating said blocks, a head mounted in each block for vertical movement, means for exerting upward pressure on said head, and means for permitting the head to be raised when it is moved into a position below one of the openings through said lower guide strip and for depressing said head as it is moved into position above the other said opening.

6. In automobile sleighs, the combination of a casing provided with two spaced runners, guide strips mounted above said runners in spaced relation thereto and to each other, the lower one of said guide strips being provided with spaced openings, blocks slidable between the lower guide strip and the runners, means for reciprocating said blocks, a head mounted in each block for vertical movement, means for exerting upward pressure on said head, and means for permitting the head to be raised when it is moved into a position below one of the openings through said lower guide strip and for depressing said head as it is moved into position above the other said opening, said means being adjustable so as to permit the head to be raised through either one of said openings and depressed as it passes into position above the other opening, optionally.

7. In automobile sleighs, the combination of a casing provided with two spaced runners, guide strips mounted above said runners in spaced relation thereto and to each other, the lower one of said guide strips being provided with spaced openings, blocks slidable between the lower guide strip and the runners, means for reciprocating said blocks, a head mounted in each block for vertical movement, means for exerting upward pressure on said head, and means for permitting the head to be raised when it is moved into position below one of the openings through said lower guide strip and for depressing said head as it is moved into position above the other said opening, said means being adjustable so as to permit the head to be raised through either one of said openings and depressed as it passes into position above the other opening, optionally, or to prevent the head from entering any of said openings.

8. In automobiles sleighs, the combination of a casing provided with spaced runners, guide strips mounted above the runners and in spaced relation, the lower one of said strips being provided with a plurality of spaced openings, blocks slidable between the lower guide strip and the runners, a head carried by each block and provided with a gripping point operable between the runners, means for exerting upward pressure on said head, toggle arms connected to said blocks, means connectible to the wheels of an automobile so as to be operated thereby for contracting and spreading the toggle arms, and guide plates positioned above the openings through said lower guide strip adjustable so as to permit the heads to be raised through certain of said openings and to be depressed when moved into position above certain others of said openings.

9. In automobile sleighs, the combination of a casing provided with spaced runners, guide strips mounted above the runners in spaced relation thereto and to each other, the lower one of said guide strips being provided with a plurality of spaced openings, blocks slidable between the lower guide strip and the runners, a head carried by each of said blocks and provided with a downwardly extending gripping point operable between the runners, means for exerting upward pressure on said head, toggle arms pivotally secured to said blocks, a rotatable shaft, a crank keyed thereon and connected to said toggle arms, a sprocket wheel secured on said shaft, a second shaft rotatably mounted in the casing in rear of first said shaft, means for connecting said second shaft to the wheel of an automobile so as to be rotated thereby, a sprocket keyed on the said second shaft, and driving connections between the two said sprockets.

10. In automobile sleighs, the combination of a casing provided with spaced runners, two guide strips secured above the runners parallel therewith and in spaced relation thereto and to each other, the lower one of said strip being provided with a plurality of openings, blocks slidably mounted between the lower guide strip and the runners, means for reciprocating said blocks in opposite directions, a gripping head carried by each block, means for exerting upward pressure on said head, an arcuate guide plate rockably mounted adjacent each of the said openings through the lower guide strip, and means for rocking said plates so as to raise or depress the same.

In testimony whereof I affix my signature in presence of two witnesses.

CHESTER A. ROBERTS.

Witnesses:
HERMAN VAUPELL,
NELLIE EGGLESTON.

Copies of this patent may be obtained for five cents each, by addressing the "Commissioner of Patents, Washington, D. C."